United States Patent [19]
Janci

[11] 3,960,397
[45] June 1, 1976

[54] ENERGY-ABSORBING BUMPER SYSTEM
[76] Inventor: John Janci, 1125 N. Karlov, Chicago, Ill. 60651
[22] Filed: Jan. 27, 1975
[21] Appl. No.: 544,131

Related U.S. Application Data
[63] Continuation of Ser. No. 352,580, April 19, 1973, abandoned.

[52] U.S. Cl. ................................ 293/86; 267/139; 293/71 P
[51] Int. Cl.² ........................................ B60R 19/08
[58] Field of Search ................... 267/116, 139, 140; 293/71 P, 85, 86, 88

[56] References Cited
UNITED STATES PATENTS

| | | | |
|---|---|---|---|
| 1,380,759 | 6/1921 | Whitaker | 293/71 P |
| 2,890,904 | 6/1959 | Materi | 267/63 R |
| 3,097,725 | 7/1963 | Peterson | 267/128 |
| 3,313,567 | 4/1967 | Sturman | 293/86 |
| 3,432,200 | 3/1969 | Barton | 293/88 |
| 3,741,560 | 6/1973 | Schaller | 267/140 |

Primary Examiner—Evon C. Blunk
Assistant Examiner—Jeffrey V. Nase
Attorney, Agent, or Firm—Bernard L. Kleinke

[57] ABSTRACT

An energy-absorbing bumper system adapted to be mounted on a support structure which may be either a stationary structure or a movable structure, such as a vehicle, includes a deformable hollow longitudinally-extending bumper member, and a piston cylinder assembly adapted to be fixedly mounted on the support structure. The assembly includes a piston head reciprocatively mounted within the chamber of the assembly and is adapted to move toward and away from the structure, a piston rod fixedly connecting the head and the bumper member, and a head retaining device for maintaining releasably the head against the force of a spring which urges resiliently the head toward the bumper member, the head retaining device being adapted to release the head in response to a member-deforming impact on the hollow member. The bumper member includes an elongated gas-tight chamber extending the length of the bumper member and containing a gas under pressure to help absorb impacts. The head retaining device includes a pin extending through an opening in the piston cylinder assembly and into an aligned hole within the head to retain it against the force of the spring so that upon impact the head moves sufficiently rearwardly to release the pin and thereby to release the spring acting on the head to neutralize the impact sustained by the bumper member.

7 Claims, 3 Drawing Figures

U.S. Patent  June 1, 1976  3,960,397
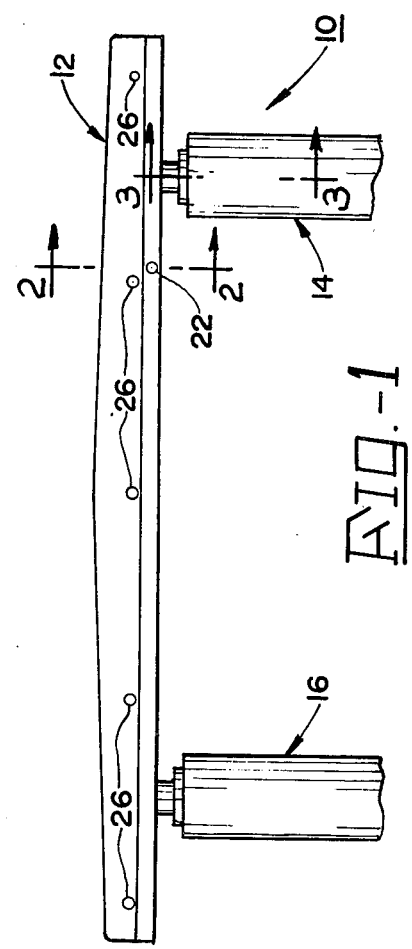
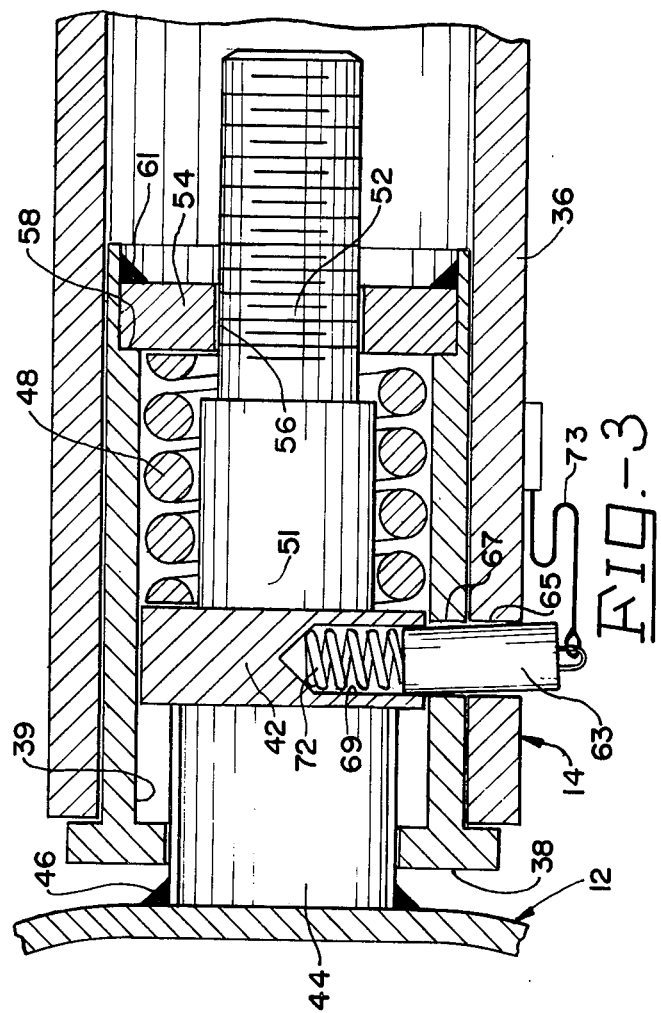
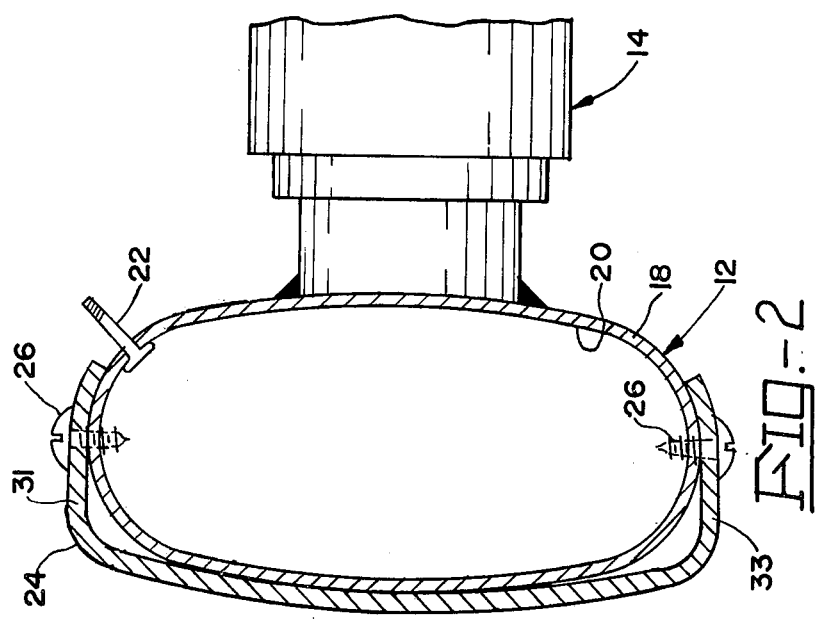

ENERGY-ABSORBING BUMPER SYSTEM

This is a continuation of application Ser. No. 352,580, filed Apr. 19, 1973, now abandoned.

The present invention relates to an energy-absorbing bumper system, which may be employed with movable structures, such as vehicles, or which may be employed in connection with stationary structures, such as guard rails for roadways.

Energy-absorbing bumper systems have been employed for various applications, such as motor vehicles, for safety purposes. Such bumper systems, such as automotive bumper systems, have employed shock absorbers. However, such energy-absorbing bumpers are relatively expensive to manufacture and their effect is relatively small and limited in extent of protection as compared to the weight of large massive vehicles. Therefore, it would be highly desirable to have an energy-absorbing bumper system, which is relatively inexpensive to manufacture, and which provides a relatively large capacity for absorbing impacts thereon.

Therefore, the principal object of the present invention is to provide a new and improved energy-absorbing bumper system.

Briefly, the above and further objects are realized in accordance with the present invention by providing a new and improved bumper system, which includes a deformable hollow longitudinally-extending bumper member, and a piston cylinder assembly adapted to be fixedly mounted on a support structure. The piston cylinder assembly includes a piston head reciprocatively mounted within the chamber of the piston cylinder assembly and adapted to move toward and away from the structure, a rod fixedly connecting the head and the bumper member, and a head retaining device for maintaining releasably the head against the force of a spring which urges resiliently the head toward the bumper member, the device being adapted to release the head in response to a member-deforming impact on the hollow member for facilitating the absorbing of impacts upon the bumper member. The bumper member includes an elongated gas-tight chamber extending the length of the member and containing a gas under pressure, whereby the bumper member deforms and absorbs small impacts without releasing the spring and causes the spring to be released under substantially greater impacts upon the bumper member.

Further objects and advantages and a better understanding of the present invention will be had by reference to the following detailed description taken in connection with the accompanying drawings, wherein:

FIG. 1 is a fragmentary plan view of a bumper system of the present invention;

FIG. 2 is an enlarged transverse cross-sectional view of the bumper system of FIG. 1 taken substantially along the line 2—2 thereof; and FIG. 3 is an enlarged cross-sectional view of a portion of the bumper system of FIG. 1 taken substantially along the line 3—3 thereof.

Referring now to the drawings, and more particularly to FIG. 1 thereof, there is shown an energy-absorbing bumper system 10, which is constructed in accordance with the present invention. The bumper system 10 generally includes an elongated bumper assembly 12 mounted by means of a plurality of spaced-apart piston cylinder assemblies 14 and 16 to a support-structure (not shown), which may be either a movable structure, such as a motor vehicle, or a stationary structure, such as a guard rail for a roadway. When employed for vehicles, the assembly 10 generally includes two piston cylinder assemblies as shown in the drawings, but when the system 10 is employed as a bumper for a stationary structure, the bumper member is supported by a greater number of spaced-apart piston cylinder assemblies in accordance with the desired length of the bumper member. In both applications, the bumper assembly 12 is mounted parallel to the ground and may have different configurations, such as a wrap-around style of bumper (not shown) for automobiles. As shown in FIGS. 1 and 2 of the drawings, the bumper assembly 12 includes a bumper member 18 which is oval-shaped in cross-section and hollow throughout its length to provide a gas-tight chamber 20, the bumper member 18 being closed at its opposite ends and having a filling valve 22 for enabling the chamber 20 to be filled with a gas under pressure, such as air under pressure. A decorative channel-shaped cover 24 extends over the front half of the bumper member and is fastened thereto by any convenient technique, such as the screws 26 which extend through the upper and lower flanges 31 and 33, respectively, of the cover 24, the screws 36 being sealed in an air tight manner by any suitable technique, such as washers (not shown).

The gas under pressure within the chamber 20 serves as a shock-absorbing cushion to absorb small impacts without activating the assemblies 14 and 16.

Considering now the piston cylinder assembly in greater detail with reference to FIG. 3 of the drawings, the assembly 14 includes an outer tubular housing 36 which includes a rear end portion (not shown) adapted to be fixedly mounted on the support structure, and an inner tubular housing 38 mounted within and fixed to by suitable means (not shown) the front end portion of the outer housing 36 and having a cylindrical piston chamber 39 for containing a circular piston head 42 slidably mounted therewithin and rigidly connected to the bumper assembly 12 by means of a rod 44 fixed at its rear end to the piston head 42 and its front end to the bumper assembly 12, the rod 44 being fixed to the bumper assembly 12 by any suitable means such as the annular weld 46. A heavy stiff normally-compressed coil spring 48 surrounds a rearwardly extending rod 51 extending from and integrally connected to the rear face of the head 42 to urge resiliently the head 42 toward the bumper assembly 12. A reduced-diameter threaded rear portion of the rod 51 has a rear end portion extending loosely through an annular plate 54 having a central hole 56, the annular plate 54 being positioned against a rearwardly facing annular shoulder 58 and being fixed to the inner housing 39 by any suitable technique, such as the annular weld 61. In the retracted position of the head 42 as shown in FIG. 3, the spring 48 is compressed between the head 42 and the plate 54. A retaining pin 63 extends through a pair of aligned openings 65 and 67 in the respective outer and inner housings to engage an opening 69 in the side of the piston head 42 to retain it in a retracted position against the force of the compression spring 48. A normally compressed coil spring 72 within the opening 69 ejects the pin 63 when the piston head 42 is moved slightly rearwardly when the bumper assembly 12 receives a sufficient impact to compress the spring 48 still further to a point where the pin 63 is free to be ejected by the spring 72, whereby the energy stored within the spring 48 is permitted to react against the impact acting on the bumper assembly 12. As a result, the impact is neutralized. For the purpose of retracting the head 42 after being released, a nut (not shown) can be threaded onto the threaded end portion 52 and tightened against the outside face of the plate 54 with a conventional tool, such as a wrench, until the rod portion 52 is moved axially outwardly against the force of the spring 48. The rod portion 52 is thus backed out of the plate until the pin 63 can be inserted through the hole 65 and into the hole 67. Thereafter, the nut may be removed from the rod portion 52. In order to prevent the pin from being lost after being ejected, a cable 73 is fastened at one end to the pin 63 and at its opposite end to the outer housing 36.

When a high-speed substantial impact is exerted on the assembly, the spring 48 is released to permit it to release its energy forwardly. Thus, when the system of the present invention is employed on the front end of a vehicle upon impact the vehicle snaps backwardly and thus tends to prevent the rear end portion of the vehicle from lifting upwardly, whereby damage to the vehicle and injury to its passengers is lessened. Moreover, unlike conventional shock absorber bumper systems, piston cylinder assemblies of the present invention are relatively shorter in length and thus the bumper assembly is mounted in close proximity to the body of the vehicle in an aesthetically-appealing manner.

While the present invention has been described in connection with a particular embodiment thereof, it will be understood that those skilled in the art may make many changes and modifications without departing from the true spirit and scope of the invention. Therefore, by the appended claims it is intended to cover all such changes and modifications as come within the true spirit and scope of this invention.

What is claimed is:

1. An energy-absorbing bumper system adapted to be mounted on a support structure, comprising:

a deformable hollow longitudinally extending bumper member;

means defining an elongated chamber adapted to be fixedly mounted on the support structure, said chamber having a fixed member disposed therein;

a piston head reciprocatively mounted within said chamber and adapted to move forwardly toward and rearwardly away from said structure;

mounting means fixedly connecting said head and said bumper member;

spring means extending between said fixed member and said piston head for urging resiliently said head toward said bumper member;

head retaining means for maintaining releasably said head against the force of said spring means to compress it between said head and said fixed member to store energy in said spring means and for releasing said head in response to at least a predetermined amount of impact acting toward said head on said hollow member to enable said spring means to exert said energy forwardly;

releasing means for causing said head retaining means to release said head upon said predetermined amount of impact being applied to said head in opposition to said force of said spring means via said bumper member and said mounting means to commence moving said head toward said fixed member;

said bumper member including an elongated gas-tight chamber extending the length of said bumper member and being oval-shaped in cross-section, said chamber being filled with a gas under pressure;

said means defining a chamber including a hole communicating with said chamber, said head including an opening therein, said head retaining means including a pin extending through said hole in said means defining a chamber and into said opening; and said releasing means further including second spring means for ejecting said pin from said opening.

2. An energy-absorbing bumper system according to claim 1, wherein said rear end portion is threaded.

3. An energy-absorbing bumper system according to claim 1, wherein said bumper system includes an opening to said chamber and a valve communicating with said opening for filling said chamber with said gas under pressure.

4. An energy-absorbing bumper system according to claim 1, wherein the first-mentioned spring means comprises a coil spring.

5. An energy-absorbing bumper system according to claim 1, wherein said second spring means comprises a second coil spring.

6. An energy-absorbing bumper system according to claim 1, wherein said bumper member includes a decorative channel-shaped cover.

7. An energy-absorbing bumper system according to claim 1, wherein said releasing means includes a cable connecting said pin and said means defining a chamber to facilitate the recovery of the pin after it is ejected from said opening.

* * * * *